Patented Aug. 22, 1944

2,356,151

UNITED STATES PATENT OFFICE 2,356,151

POLYPHENYLOL ALKANE RESINS

John W. Eastes, Philadelphia, Pa., assignor to The Resinous Products & Chemical Company, Philadelphia, Pa., a corporation of Delaware No Drawing. Application April 9, 1941, Serial No. 387,686

16 Claims. (Cl. 260—45)

This invention relates to nitrogenous resinous compositions which are insoluble in dilute acids or in salt solutions and which have particularly suitable properties for their repeated use in the removal of acid-forming constituents from fluids. This invention more particularly concerns the preparation of resinous compositions comprising the insoluble reaction products of a polyphenylol alkane or cycloalkane, formaldehyde, and an alkylene polyamine, the alkylene group of which may be interrupted by —NH— to form alkylene chains of at least two carbon atoms each between nitrogen atoms. The insoluble reaction products of this invention are characterized by their high capacity for absorbing acidic constituents, their low solubility in water or acidic solutions, their physical strength, their freedom from imparting color to solutions passed over them, their efficiency upon repeated regeneration and use, and many other favorable properties, which have been lacking or deficient in the nitrogenous resins which have heretofore been proposed for the exchange of anions.

It has been found that nitrogenous resinous compositions having the above desirable properties are obtained by reacting a polyphenylol alkane or cycloalkane with formaldehyde to form a soluble methylol compound and reacting this under controlled conditions as to temperature with an alkylene polyamine to form a resinous gel which is then dried within proper temperature limits to yield an insoluble nitrogenous resin.

There may be selected as a polyphenylol compound any of the alkanes or substituted alkanes which contain two or more hydroxyphenyl groups with hydrogen in reactive positions available for substitution (i. e., positions which are ortho or para to the —OH group). Typical of these polyphenylols are dihydroxyphenyl dimethyl methane, dihydroxyphenyl ethyl methyl methane, dihydroxyphenyl methyl phenyl methane, dihydroxyphenyl cyclohexane, 2,2,5,5-tetrahydroxyphenyl hexane, etc. The phenyl groups may carry a neutral substituent such as alkyl, alkoxy, aryloxy, halogeno, acyl, etc. The polyphenylols, as is known, may be prepared by condensation of a suitable phenol with an aldehyde or ketone, as from phenol and acetone, cresol and acetone, phenol and acetonyl acetone, phenol and cyclohexanone, phenol and benzophenone, phenol and methyl ethyl ketone, phenol and formaldehyde (under proper conditions), phenol and acetaldehyde, etc.

The polyamines which are useful in this invention are the alkylene polyamines such as ethylene diamine, diethylene triamine, triethylene tetramine, tetraethylene pentamine, N,N'-bis-(aminopropyl)ethylene diamine, propylene diamine, tris(trimethylene) tetramine, and other polyalkylene polyamines.

Formaldehyde may be used as an aqueous or organic solution, as a gas, or as a solid polymer, such as paraformaldehyde. Part of the formaldehyde may be supplied by compounds which yield methylene groups such as hexamethylene tetramine.

In order that resins of high capacity, low solubility, and good physical properties may be obtained, the three main reactants are combined in such a way that polyamine groups become attached to the phenolic nuclei through methylene groups and at the same time the reaction products are carried to an advanced stage of resinification through cross linkages. To fulfill these requirements to the maximum degree the reaction should be controlled within certain well-defined conditions.

In the first step of the reaction the polyphenylol alkane or cycloalkane is reacted with formaldehyde to form a soluble methylol compound. This is most readily accomplished in aqueous solution by solubilizing at least part of the polyphenylol alkane with alkali and reacting with formaldehyde. Enough alkali to solubilize the whole of the polyphenylol compound is not necessary, for during the subsequent reaction with formaldehyde, that part in suspension is gradually dissolved. After the polyphenylol alkane has been suspended or partly dissolved as a phenate, it is reacted with formaldehyde under such conditions that an insoluble resin does not result at this point. This is readily accomplished by mixing reactants slowly and/or by cooling. During mixing it is desirable to maintain the temperature between 30° C. and 60° C. The temperature may then be raised to ensure complete reaction, temperatures of 80° C. to 90° C. being suitable at this stage. In a short time a clear solution results even though the original reaction mixture may have contained the polyphenylol alkane in suspension.

It is now necessary to cool the solution of the methylol compound so as to be able to control the next stage. The best results are obtained by cooling the methylol solution to below 32° C. The alkylene polyamine is then carefully added. An exothermic reaction ensues, during the course of which the temperature of the reacting mixture should be held below about 40° C. If the temperature is allowed to rise unduly, there usually separates from the reaction mixture curds of an insoluble phenol-formaldehyde type resin which has been catalyzed by the presence of the polyamine and the desired combination of polyphenylol alkane, formaldehyde, and polyamine does not result.

After this exothermic reaction has subsided, there may be added additional formaldehyde to ensure a strong, insoluble resin. This addition should be made under controlled conditions of temperature in order to avoid separation of insoluble resin at this stage. The reaction mixture of methylol compound and polyamine should, therefore, be cooled below about 32° C. and the formaldehyde added slowly with good stirring. It should be noted, however, that the second addition of formaldehyde is not essential since there may be used at the start sufficient formaldehyde to form the desired type of resinous product and by control of the various stages of reaction a nitrogenous resin of excellent properties can be produced. On the other hand, the addition of formaldehyde in two stages somewhat simplifies controlling the reaction involved. For this reason the two-stage addition of formaldehyde is preferred.

After the addition of all the reactants, the reaction mixture is brought to a gel stage. If a gel has not formed already, it may be produced by heating the mixture to 75° C. to 100° C. The gel is then broken up and dried between about 70° C. and the temperature at which scorching or incipient decomposition of the resulting resin would occur. While this upper temperature varies somewhat for various combinations, it is in general about 135° C. The dried resin may now be used for purposes of anion exchange or absorption of acid components from a gaseous or liquid mixture. Preferably the dried resin is crushed to a desired size such as 20/40 mesh or 40/50 mesh, washed free of alkali and, if desired, dried at a moderate temperature before use.

The amount of formaldehyde to be used to yield an insoluble reaction product is in general at least one mol for each phenylol group plus one mol for each mol of amine. Excess formaldehyde over this is permissible and may contribute to the hardness of the final resin. Hardness, as well as strength, also results by increasing the proportion of the phenylol compound. Higher proportions of the phenylol compounds are particularly useful in the preparation of anion exchange resins which are to be used with liquids which are warm or hot. On the other hand, the use of relatively large ratios of polyamine to phenylol increases the capacity of the resin for absorption of acidic constituents. To impart the best properties for general use, we have found that there should be used from one-half to two mols of a polyamine for each phenylol group. When optimum proportions of reactants are used, one to two mols of polyamine and two to four mols of formaldehyde are used for each phenylol group.

Further illustrative details will be found in the following examples.

*Example 1*

57 parts of dihydroxyphenyl dimethyl methane and 8 parts of sodium hydroxide were added to 150 parts of water and the mixture stirred for 15 minutes to effect solution of part of the phenol. There was then added 40 parts of an aqueous 37% formaldehyde solution. The temperature of the reaction mixture was then held at 50–60° C. for two hours, a clear solution resulting. The mixture was cooled below 30° C. and 73 parts of triethylene tetramine was slowly added. The exothermic reaction which took place was carefully controlled by cooling. When the tetramine was all added, the mixture was heated to 86° C., 80 parts of formaldehyde added, and the temperature kept at 75–80° C. for five hours. The soft, rubbery gel which formed was removed from the reaction vessel, dried at 125–130° C. for 16 hours, crushed, screened to 20/40 mesh, washed with water, with 5% sodium carbonate solution, and again with water, and air-dried. The yield was 95 parts of a very hard resin of high capacity which absorbed 347 milligrams of sulfuric acid per gram and was particularly efficient when used in a column under conditions of regeneration and re-use in situ.

*Example 2*

285 parts of dihydroxyphenyl dimethyl methane and 31 parts of sodium hydroxide were added to 600 parts of water and the mixture stirred until most of the phenylol compound had been dispersed or dissolved. 200 parts of aqueous 37% formaldehyde was then added and the reaction mixture heated to about 60° C. until clear. The mixture was cooled to 30° C. and 365 parts of triethylene tetramine was added while the reaction mixture was held below 40° C. by cooling. When the reaction had subsided, 300 parts of 37% formaldehyde was added, resulting in the formation of a gel, which was removed from the reaction vessel and placed in an oven at 130° C. for fifteen hours. The hard resin thus obtained was crushed, screened to 20/40 mesh size, washed with water, dilute sodium carbonate solution, and again with water, and air-dried at 60° C. It had a capacity of 378 milligrams of sulfuric acid per gram.

*Example 3*

57 parts of diphenylol dimethyl methane and 8 parts of sodium hydroxide were taken up in 150 parts of water and the mixture stirred for 15 minutes. 41 parts of aqueous 37% formaldehyde was added and the mixture held at about 60° C. until a clear solution resulted. The solution was chilled and 95 parts of tetraethylene pentamine was slowly added. When the reaction therewith had subsided, 81 parts of 37% formaldehyde was added and the reaction mixture maintained at 80° C. for an hour. The resulting gel was then placed in an oven at 110° C. for overnight giving a hard resin, which was crushed, screened to 20/40 mesh, washed with water, and dried at 60–70° C. The resin had an apparent density of 0.53 and absorbed 368–370 milligrams of sulfuric acid per gram.

The above procedure was repeated with molecular equivalents of ethylene diamine and of diethylene triamine. The resins thus obtained were likewise hard and strong, giving an excellent performance in the absorption of acidic materials, and in the exchange of anions.

*Example 4*

57 parts of diphenylol dimethyl methane, 47 parts of phenol, and 8 parts of sodium hydroxide were added to 200 parts of water and stirred for 20 minutes. 142 parts of 37% formaldehyde was then added and the temperature raised to 50° C. and held at this point for an hour. The solution was then cooled to 30° C. and 115 parts of triethylene tetramine added. The reaction mixture was stirred for 15 minutes and then cooled to 30°

C. when 163 parts of 37% formaldehyde was added. The mixture was gradually heated to 95° C. and put into trays which were placed in an oven at 115° C. for 20 hours. The resulting resin was crushed, screened, washed, and dried at 60° C. as in the above example. The final product was hard, and efficient as an anion exchange resin.

Example 5

A solution was prepared with 8 parts of sodium hydroxide and 150 parts of water and to this was added 64.1 parts of the di(hydroxymethylphenyl) dimethyl methane prepared by condensing o-cresol and acetone. There was added thereto 21 parts of aqueous 37% formaldehyde solution. The reaction mixture was then heated at 50° C. for 80 minutes and at 75° C. for 30 minutes to give a clear solution. This was cooled to 30° C. and 48 parts of tetraethylene pentamine slowly added while the temperature of the resulting mixture was held at 30-32° C. by external cooling. There was then slowly added 81 parts of aqueous 37% formaldehyde while the mixture was stirred. Considerable heat was evolved, causing the temperature to rise and a gel to form. The gel was heated on a steam bath (80-90° C.) for two hours, broken up and dried on trays in an oven at 120° C. for 20 hours. The resulting product consisted of 125 parts of a hard nitrogenous resin which had a high capacity for absorbing acids and was capable of repeated regeneration and use.

Example 6

A mixture of 80 parts of potassium hydroxide, 1200 parts of water, and 402 parts of the diphenylol product from phenol and acetaldehyde ($CH_3CH(C_6H_4OH)_2$) was warmed to cause partial solution of the diphenylol and stirred for 15 minutes. The mixture was then cooled to room temperature, 326 parts of aqueous 37% formaldehyde solution slowly added, and the resulting mixture gradually heated over the course of two hours to about 80° C. until a clear solution was obtained. The solution was cooled to room temperature and 760 parts of tetraethylene pentamine slowly added while the temperature of the reacting mixture was held below 40° C. The solution was again cooled to room temperature and 650 parts of aqueous 37% formaldehyde solution stirred in while the temperature was prevented from rising by external cooling. The mixture was then warmed to about 80° C. with formation of a gel, which was dried in an oven at 120° C. for 20 hours. The dried material was crushed to 20/40 mesh size, washed with water, then with a 5% soda ash solution, again washed with water, and dried in open trays. There was obtained 1500 parts of a very hard, orange-colored resin which had high capacity for acidic materials.

Example 7

228 parts of dihydroxyphenyl dimethyl methane and 12 parts of sodium hydroxide were taken up in 550 parts of water. The mixture was cooled to about 25° C. and 400 parts of aqueous 37% formaldehyde slowly added thereto while the temperature was held at about 30° C. and the mixture was stirred. The temperature was slowly raised to about 60° C. and stirring continued until the mixture became homogeneous. It was cooled to 30° C. and 225 parts of diethylene triamine gradually added while the reaction mixture was held at about 30-32° C. by external cooling. When the exothermic reaction was apparently over, the temperature of the reaction mixture was raised to 75-80° C. The resulting gel was broken up, dried in an oven at 115° C. for 16 hours, washed with water, and dried in a current of warm air. The product obtained was a hard resin of high capacity for acids and capable of regeneration.

Example 8

57 parts of dihydroxyphenyl dimethyl methane and 8 parts of sodium hydroxide were taken up in 150 parts of water and the mixture cooled below 30° C. There was slowly added 41 parts of 37% aqueous formaldehyde while the mixture was cooled and stirred. The reaction mixture was then warmed until it became practically clear, whereupon it was cooled to 30° C. and 95 parts of tetraethylene pentamine slowly added while the temperature was held at 32° C. by external cooling. There was thereupon stirred into the reaction mixture 40 parts of tapioca starch. This mixture was heated for two hours at 95° C., then cooled to 30° C., and treated with 82 parts of 37% aqueous formaldehyde. The reaction mixture, which was very thick at this point, was placed on trays and heated in an oven at 110° C. for two hours. The dried material was crushed, sifted to 20/40 mesh, washed with water, with 5% soda ash solution, and again with water and air-dried. The analysis showed 6.9% moisture in the finished material and 15.3% nitrogen, calculated on a dry basis. Under the microscope the product appeared as regular, transparent particles, without crystalline structure and free from the angularities characteristic of conchoidal fracture of the usual phenol-formaldehyde resins. 24.1 lbs. of the crushed and sifted dry material occupied one cubic foot when wet with water.

This resin was tested for anion capacity by running a solution containing 73 P. P. M. of hydrochloric acid and 441 P. P. M. of sulfuric acid by downflow through a 12 mm. tube packed with 77 cc. of the resin. From the absorption of both acids the resin has a rated capacity of 33,510 grains per cubic foot of total anions calculated, as is conventional, as calcium carbonate. The resin was regenerated by the slow downflow of a 4% soda ash solution and washing. The regeneration was carried out at one gallon per square foot per minute and with an amount of soda ash equivalent to one-half pound of sodium chloride per kilograin of anions removed as calcium carbonate. The capacity was again determined with mixed acid solution and found to be the same as before.

Example 9

57 parts of dihydroxyphenyl dimethyl methane and 8 parts of sodium hydroxide were taken up in 150 parts of water and the mixture cooled to about 25° C. There was added 41 parts of 37% aqueous formaldehyde solution while the mixture was stirred and cooled. The temperature of the mixture was thereupon raised to about 90° C. to give a practically clear solution and then reduced to 30° C. 95 parts of tetraethylene pentamine was slowly added while the temperature was held below 40° C. When the exothermic reaction had subsided, the temperature was raised to 75-80° C. and then reduced to 30° C., whereupon 82 parts of 37% aqueous formaldehyde was added. A gel formed immediately but the mixture was kept on the steam bath (90-95° C.) for an hour. 40 parts of ferrosilicon was stirred in. The resulting mixture was at once transferred to trays and placed in an oven at 115° C. for 16 hours. The hard, black resin which resulted was crushed to a 20/40 mesh size, washed with water, with 5% soda ash solution, and again with water, and dried in a warm oven. The product contained 3.63% moisture and on a dry basis had a nitrogen content of 15.2% and an iron content of 4.63% (as Fe).

A 12 mm. tube was filled with 57.85 cc. of the resin, previously wetted with water. A solution containing 77 P. P. M. of hydrogen chloride and 431 P. P. M. of hydrogen sulfate per liter was passed downflow at a 5 gallon rate (5 gals./sq. ft./min.). 2000 cc. of the solution was passed before chloride ion appeared in the effluent. The capacity up to this point was 32,475 grains per cubic foot (anion as calcium carbonate). The resin was well suited for the adsorption of anions from solutions.

The resins described herein are readily revivified by treatment with a solution containing a substance yielding the anion desired for replacement of another anion in a liquid. When the anion in a liquid is to be replaced by a hydroxyl ion, the resin is treated with an alkaline solution, such as a solution of sodium hydroxide, ammonia, potassium hydroxide, sodium carbonate, etc. If it is desired to replace a sulfate ion, for example, with a chloride ion, the resin may be treated with a solution of a chloride, such as sodium chloride, at a suitable concentration. The treating solution may be washed away and the resin used for the desired ion exchanged.

While the nitrogenous resins prepared as described from polyphenylol alkanes, formaldehyde, and alkylene polyamines are unusually effective for the absorption of acids or the exchange of anions from liquids containing ionizable substances, they also possess some capacity for the absorption of cations and may be regenerated in this respect. When the resins of this invention are used in conjunction with cation-exchange materials, such as acid zeolites or cation exchange resins, liquids may be purified in high degree from dissolved salts.

In place of the polyphenylol alkanes which have been shown in the above examples, there may be used other polyphenylol derivatives in which the phenyl groups are not directly connected with each other, such as dihydroxyphenyl cyclohexane and dihydroxyphenyl sulfone. The polyphenylols may also be used with a minor proportion of other phenols, such as phenol itself as has been illustrated in one of the examples. The resins obtained by such variations are of high capacity for acidic constituents and have excellent physical properties. This combination of chemical and physical properties of the polyphenylol alkane-formaldehyde-polyamine resins is optimum for use in large scale equipment with alternate cycles of absorption and regeneration and under continuous use has shown full effectiveness even after hundreds of such cycles.

The nitrogenous resins may be prepared in the presence of carriers or fillers, such as silica, alumina, starch, woodflour, etc. Also the resins may be mixed with such inert materials.

Polyphenylol-formaldehyde type resins carrying amino-alkylene aminomethyl substituents of phenyl nuclei may also be prepared from polyphenylols in which the phenyl groups are connected through sulfur instead of through a carbon linkage as here described. The aminomethyl resins from the phenylols having a sulfur linkage are claimed in application Serial No. 387,684 filed on even date.

I claim:

1. An insoluble nitrogenous resinous composition suitable for the absorption of acidic constituents from fluids and for ion exchange which comprises the product obtained by reacting by condensing together in an aqueous medium a polyphenylol alkane, one-half to two mols of an alkylene polyamine per phenylol group present in said alkane, and formaldehyde in an amount at least equivalent both to the phenylol groups and to the mols of polyamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

2. An insoluble nitrogenous resinous composition suitable for the absorption of acidic constituents from fluids and for ion exchange which comprises the product obtained by reacting by condensing together in an aqueous medium a polyphenylol cycloalkane, one-half to two mols of an alkylene polyamine per phenylol group present in said cycloalkane, and formaldehyde in an amount at least equivalent both to the phenylol groups and to the mols of polyamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

3. An insoluble nitrogenous resinous composition suitable for the absorption of acidic constituents from fluids and for ion exchange which comprises the product obtained by reacting by condensing together in an aqueous medium a polyphenylol alkane, one-half to two mols per phenylol group thereof of a polyalkylene polyamine, the alkylene chains of which have a chain of at least two carbon atoms between nitrogen atoms, and formaldehyde in an amount at least equivalent both to the phenylol groups and to the mols of polyamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

4. An insoluble nitrogenous resinous composition suitable for the absorption of acidic constituents from fluids and for ion exchange which comprises the product obtained by reacting by condensing together in an aqueous medium a diphenylol alkane, one-half to two mols of a polyethylene polyamine, and formaldehyde in an amount at least equivalent both to the two phenylol groups and to the mols of polyamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

5. The resinous composition of claim 8 wherein the polyethylene polyamine is tetraethylene pentamine.

6. The resinous composition of claim 8 wherein the polyethylene polyamine is triethylene tetramine.

7. The resinous composition of claim 8 wherein the polyethylene polyamine is diethylene triamine.

8. An insoluble nitrogenous resinous composition suitable for the absorption of acidic constituents from fluids and for iron exchange which comprises the product obtained by reacting by condensing together in an aqueous medium diphenylol dimethyl methane, one-half to two mols of a polyethylene polyamine, and formaldehyde in an amount at least equivalent both to the two phenylol groups and to the mols of polyamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

9. A method for preparing insoluble nitrogenous resinous compositions suitable for the absorption of acidic constituents from fluids and further characterized by strength, suitability for use in columns, high capacity for acidic constituents, and stability during repeated use and regeneration, which comprises reacting by condensing together in an aqueous system a diphenylol alkane, one-half to two mols per phenylol group thereof of a polyethylene polyamine, and formaldehyde in an amount at least equivalent both to the two phenylol groups and to the mols of polyamine, continuing the reaction of these three components until a hydrophilic gel forms, and heating said gel between about 70° C. and the scorching temperature of the resulting resin until said resin is insoluble in dilute strong acids.

10. A method for preparing insoluble nitrogenous resinous compositions suitable for the absorption of acidic constituents from fluids and further characterized by strength, suitability for use in columns, high capacity for acidic constituents, and stability during repeated use and regeneration, which comprises reacting by condensing together in an aqueous system a polyphenylol alkane, one-half to two mols per phenylol group thereof of an alkylene polyamine, and formaldehyde in an amount at least equivalent both to the phenylol groups and to the mols of polyamine, continuing the reaction of these three components until a hydrophilic gel forms, and heating said gel between about 70° C. and the scorching temperature of the resulting resin until said resin is insoluble in dilute strong acids.

11. A method for preparing insoluble nitrogenous resinous compositions suitable for the absorption of acidic constituents from fluids and further characterized by strength, suitability for use in columns, high capacity for acidic constituents, and stability during repeated use and regeneration, which comprises reacting by condensing together in an aqueous system a polyphenylol cycloalkane, one-half to two mols per phenylol group thereof of an alkylene polyamine, and formaldehyde in an amount at least equivalent both to the phenylol groups and to the mols of polyamine, continuing the reaction of these three components until a hydrophilic gel forms, and heating said gel between about 70° C. and the scorching temperature of the resulting resin until said resin is insoluble in dilute strong acids.

12. A method for preparing insoluble nitrogenous resinous compositions suitable for ion exchange and further characterized by strength, suitability for use in columns, high capacity for absorbing acidic constituents, and stability during repeated use and regeneration, which comprises reacting in an aqueous medium a diphenylol alkane and formaldehyde to form a soluble methylol phenol in solution, adding thereto and reacting therewith while maintaining the temperature of the reaction mixture below about 40° C. one to four mols of a polyethylene polyamine per mol of said alkane, continuing the reaction of the three components until a hydrophilic gel is formed, and heating the gel between about 70° C. and the scorching temperature of the resulting resin until said resin is insoluble in dilute strong acids, the total amount of formaldehyde being at least equivalent both to the two phenylol groups and to the mols of polyethylene polyamine.

13. A method for preparing insoluble nitrogenous resinous compositions suitable for ion exchange and further characterized by strength, suitability for use in columns, high capacity for absorbing acidic constituents, and stability during repeated use and regeneration, which comprises reacting in an aqueous medium in the presence of an alkali a diphenylol alkane and formaldehyde to form a soluble methylol phenol in solution, adding thereto and reacting therewith while maintaining the temperature of the reaction mixture below about 40° C. one to four mols of a polyethylene polyamine per mol of said alkane, then adding additional formaldehyde to the reaction mixture, continuing the condensation of the three components until a hydrophilic gel is formed, and heating the gel between about 70° C. and about 135° C. until the resulting resin is insoluble in dilute strong acids, the total amount of formaldehyde being at least equivalent both to the two phenylol groups and to the mols of polyethylene polyamine.

14. The method of claim 13 in which the polyethylene polyamine is tetraethylene pentamine.

15. The method of claim 13 in which the polyethylene polyamine is triethylene tetramine.

16. The method of claim 13 in which the polyethylene polyamine is diethylene triamine.

JOHN W. EASTES.